Patented Apr. 20, 1943

2,316,840

UNITED STATES PATENT OFFICE

2,316,840
PREPARATION OF RUTILE TITANIUM DIOXIDE

Sandford S. Cole, Metuchen, N. J., assignor to National Lead Company, New York, N. Y., a corporation of New Jersey No Drawing. Original application August 7, 1939, Serial No. 157,886. Divided and this application January 19, 1940, Serial No. 314,643

7 Claims. (Cl. 23—202)

This invention relates to pigments comprising titanium dioxide having the crystalline structure of rutile.

The present application is a division of my Patent No. 2,290,539, which issued July 21, 1942.

Titanium dioxide, being a polymorphous substance, exists in several different crystalline modifications. The pigment properties of each modification vary to the extent that these properties are dependent upon crystalline structure. The titanium dioxide commercially available at the present time is largely the anatase modification and usually is obtained by calcining hydrous titanium oxide hydrolytically precipitated from titanium sulfate solutions. Rutile titanium dioxide as compared with anatase titanium dioxide possesses a higher index of refraction, and has a correspondingly higher tinting strength and hiding power. For this reason industry has long sought economical and practical methods for preparing rutile titanium dioxide adaptable for use as a pigment. As yet, however, the search has proved fruitless.

The prior art efforts to prepare rutile titanium dioxide followed two general lines of research:

I. *The calcination of hydrous titanium oxide hydrolytically precipitated from titanium halide solutions.*—Weiser and Milligan, J. Phys. Chem., vol. 38 (1934), page 513, et seq., Kubelka, U. S. Patent No. 2,062,133 and others have shown that the hydrous titanium oxide obtained from halide, particularly chloride, solutions of titanium may be calcined directly to rutile titanium dioxide. However, the use of chloride solutions involves certain inherent difficulties which render impractical this method of preparing rutile titanium dioxide. First, the cost of construction of apparatus resistant to aqueous and gaseous hydrochloric acid is prohibitive. Second, the hydrous titanium oxide resulting from the hydrolysis of a halide solution, due to the peptizing action of the halide ion is in a state of subdivision so fine that separation from the hydrolysis mother liquor, as by filtration, is extremely difficult and the resulting hydrous titanium dioxide due to its excessively fine particle size cannot be calcined into a product having a particle size suitable for use as a pigment.

II. *The conversion of anatase titanium dioxide into rutile titanium dioxide by prolonged heat treatments at elevated temperatures.*—Although anatase titanium dioxide may be converted to rutile titanium dioxide by heating at a high temperature (about 900° C. and above) for relatively long periods of time the conversion is accompanied by other effects which render the rutile titanium dioxide so obtained unfit for use as a pigment. Under these conditions excessive grain growth takes place so that the product becomes too coarse for use as a pigment, and no milling methods known to the art at the present time will suffice to reduce the product to a suitable and uniform particle size. At the same time, there takes place a change in color and the substantially pure white anatase generally assumes after such conversion to rutile a yellowish tone which is so intense as to render the product incapable of being employed as a white pigment.

By means of the present invention it is possible to convert anatase titanium-oxygen compounds into rutile titanium dioxide, more efficiently and more cheaply than heretofore. At the same time, the rutile titanium dioxide resulting from the practice of my invention is excellently adapted for use as a pigment, since it retains all the advantages of the original anatase form and at the same time possesses an enhanced tinctorial and hiding power.

In copending application, Serial No. 157,888, filed August 7, 1937, of which I am a joint applicant, there is described a method of preparing pigmentary compositions comprising rutile titanium dioxide and solid solutions of titanium dioxide in zinc orthotitanate. In the practice of the invention set forth in the aforementioned application the rutile titanium dioxide is obtained from anatase titanium dioxide by heat-treating anatase titanium dioxide in admixture with zinc orthotitanate, or a compound of zinc capable of reacting with titanium to form zinc orthotitanate, at temperatures above the stability point for solid solutions of the ZnO-TiO$_2$ system.

My present invention is based upon the discovery that anatase titanium-oxygen compounds can be readily converted to rutile titanium dioxide when a mixture comprising anatase titanium-oxygen compounds and an inorganic compound capable of reacting in the solid phase with anatase titanium-oxygen compounds to form a solid combination possessing a critical thermal stability point and which is capable of decomposing without change in phase is heated at temperatures above the stability point thereof.

The inorganic compounds most useful in the practice of my invention, which are capable of entering into a solid phase reaction with anatase titanium-oxygen compounds to form a combination having a critical stability point and being capable of decomposing without change in phase, may be classified within certain crystallographic groups, including the spinel group, the corundum group, the ilmenite group, the phenacite group and the sodium chloride group, as described, for example, in Dana's Textbook of Mineralogy—W. E. Ford. J. Wiley & Sons, Inc., New York, New York (1921).

I have referred in this description to a compound operable in the practice of my invention as possessing, for example, spinel crystalline structure, corundum crystalline structure, etc., meaning thereby that the compound referred to is classified within such crystallographic groups.

It will be understood, of course, that only such compounds having crystalline structure within the groups recited which form combinations capable of decomposing in the manner described are operable in the practice of the present invention. Furthermore, certain compounds within these crystallographic groups may be operable at a given set of conditions and not operable at others. For example, sodium chloride, having a typical crystalline structure of the sodium chloride group, will tend, under the preferred operating conditions of my invention, to liquefy and to take into liquid solution the anatase titanium-oxygen compounds. The use of such a compound is not contemplated in the present invention because it does not form by means of a solid-phase reaction a combination which decomposes without change in phase. When such compounds are used as will change phase, e. g., liquefy, a marked sintering will occur and the product will not have the desired pigment properties. It will thus be seen that the compound classifiable within the above-mentioned crystallographic groups which enter into solid phase reactions with the anatase titanium-oxygen compounds are those which do not either liquefy or volatilize at the operating conditions of the present invention. If either liquefaction or volatilization of the said compound occurred the reaction could not be considered as taking place in the solid phase.

Broadly described, my invention is based upon the discovery that if anatase titanium-oxygen compounds are heat-treated in admixture with certain inorganic compounds having a crystalline structure characteristic of the crystallographic groups above enumerated, there results what may be termed a catalytic conversion into titanium dioxide having the rutile crystalline structure. The conversion accomplished by my invention apparently depends upon the formation of a solid solution of titanium dioxide and the inorganic compound and the subsequent decomposition of this solid solution liberating titanium dioxide having rutile crystalline structure. My invention can be, therefore, understood when considered in terms of a solid phase reaction, that is, a reaction occurring between solids in the absence of a liquid or gaseous phase, but the subsequent explanation is not to be considered as limiting my invention to solid solution formation. It will be seen that a decomposition of the initially formed solid solution regenerates the original inorganic compound which is then free to take up in solid solution more anatase titanium-oxygen compounds. My conception of the reactions involved in the practice of my invention is that they may be considered as consisting of the alternate formation and decomposition of a solid solution until substantially all of the anatase titanium-oxygen compounds are converted into rutile titanium dioxide.

The proportion of inorganic compound required for efficient conversion is quite small. Generally speaking, I have obtained the best results when using about 2.0 percent based on the weight of titanium dioxide. However, I have obtained good results using as little as 0.5 percent. No particular advantage is to be gained by using a quantity of inorganic compound in excess of that required for optimum conversion of the anatase to rutile; in fact in most cases an excess should be avoided as detrimental to pigment properties and it is seldom necessary to exceed about 5.0 percent for the optimum conversion.

In certain cases the conversion is facilitated by first preparing a solid solution of titanium dioxide in the inorganic compound and mixing this solid solution with the anatase titanium-oxygen compounds prior to the heat-treatment. For example, I have found that a more rapid conversion of anatase titanium-oxygen compounds is effected by using a previously prepared solid solution of titanium dioxide in zinc orthotitanate, corresponding to the composition $Zn_2TiO_4.TiO_2$. I have found that such solid solutions may be readily prepared by heating desired quantities of anatase titanium dioxide and the inorganic compounds at elevated temperatures but below the stability point thereof until substantially no uncombined titanium dioxide remains in the reaction mixture.

The starting mixture of anatase titanium-oxygen compounds and inorganic compound should be uniform, intimate, and finely-divided. In order to obtain such a mixture any convenient method may be employed but I have found it convenient to mill the starting materials together in an aqueous slurry followed by dewatering and drying prior to the heat-treatment.

The heat-treatment of the mixture of anatase titanium-oxygen compounds and catalytic inorganic compound should be conducted at temperatures above the stability point of a solid solution of titanium dioxide and the inorganic compound employed. This point may easily be established by means of X-ray examinations made at various temperatures of products prepared by means of a small-scale control experiment. As soon as the diffraction lines of rutile appear on the X-ray plate it is evident that the temperature is somewhat above the stability point of the solid solution. From this point any higher temperature may be employed for the conversion of anatase to rutile. It will be appreciated, however, that the temperature employed should not be so high as to liquefy the reaction mixture or to affect adversely the pigment properties of the rutile.

To a certain extent, the time required for complete conversion of anatase to rutile varies inversely with the temperature used. This fact should be borne in mind in adapting my invention for commercial purposes where volume of material to be handled, type of furnace employed, etc., must be considered. Temperatures of from about 825° C. to about 950° C. and time periods of from three to six hours are, I have found, most practical for commercial adaptations of my inventions. Although the inorganic compounds as above defined are embraced within the scope of my invention, I have observed that under the conditions required for economical commercial operations the relative efficiency thereof to bring about the conversion of anatase to rutile varies somewhat.

In this connection I have obtained good results using inorganic compounds having the sodium chloride crystalline structure, particularly lithium titanate, $Li_2TiO_3$. Lithium titanate may be separately prepared and then mixed with the anatase titanium dioxide to be converted to the rutile modification, or, it may be formed in situ as by intimately mixing the anatase titanium dioxide with a lithium salt, as for example, lithium carbonate ($Li_2CO_3$), lithium chloride (LiCl), etc., and heating to effect both the formation of lithium titanate and conversion of anatase to rutile. I have found that lithium titanate may be formed by heating titanium dioxide with a lithium compound at temperatures of about 600° C. and above. Thus when a mixture of lithium carbonate and titanium dioxide is heated for two hours at 700° C. complete combination will be found to have occurred.

I will now describe as an illustrative example the use of a substance having the crystalline structure typical of the above-mentioned sodium chloride crystallographic group.

*Example—Lithium titanate—representative of the sodium chloride group*

For this example of the use of a compound having the sodium chloride structure lithium metatitanate, $Li_2TiO_3$, was prepared by calcining anatase titanium dioxide with lithium carbonate in equimolar proportions at 840° C. for four hours.

The product of the above reaction was mixed with hydrous titanium dioxide precipitated from a titanium sulfate solution in the proportion 100 lbs. titanium dioxide and 0.5 lb. of the lithium titanate. After calcination at 875° C. for three hours the product consisted of rutile titanium dioxide and the original quantity of lithium titanate.

It will be noted that in the foregoing description of my invention I have used the term "anatase titanium-oxygen compounds." By this expression I mean to include not only titanium dioxide the crystalline structure of which has been more or less developed, as by calcination, into the anatase modification but also such titanium compounds as hydrous titanium oxide obtained, for example, by hydrolytic precipitation from titanium sulfate solutions, which, although possessing little or no clearly defined crystalline character, yield anatase titanium dioxide on heating.

It will be understood also that my invention is not to be limited to the use of only a small amount of inorganic catalyst. Such practice is, of course, to be preferred when it is desired to obtain pigment compositions consisting essentially of rutile titanium dioxide. But where the catalyst itself possesses pigment properties as is the case, for example, when employing a zinc-magnesium titanate composition, it may be employed in any amounts desired to obtain ultimately a composite pigment of rutile titanium dioxide and the catalytic compound and/or a combination, e. g., a solid solution of titanium dioxide in the catalytic compound.

The products of my present invention are primarily useful as pigments in the preparation of surface-coating compositions. When mixed with film-forming vehicles their superior tinctorial strength due to the rutile titanium dioxide renders the resulting coating compositions especially valuable. The vehicles may consist of the straight oleaginous variety or of the oleo-resinous type containing either a natural or synthetic resin, e. g., a modified phenol-formaldehyde resin of modified polybasic acid-polyhydric alcohol resin. My products are also useful as fillers or coating materials for fibrous products, for example, paper, cardboard, cloth and the like. They may be used as fillers for rubber, for plastics or for delustering artificial silk. They may also be employed in the manufacture of various inks, either the so-called quick-drying inks or oleaginous printing inks. In general, they may be used wherever a demand exists for pigments having a high tinting strength and covering power coupled with other desirable pigment properties.

This description of my invention is given for clearness of understanding and no undue limitations should be deduced therefrom but the appended claims should be interpreted as broadly as possible in view of the prior art.

I claim:
1. A method of preparing a pigmentary composition containing rutile titanium dioxide, which comprises forming an intimate and uniform mixture of anatase titanium-oxygen compounds and a small amount of an inorganic compound capable of forming by reaction with titanium dioxide a compound having crystalline characteristics classifiable within the sodium chloride crystallographic group which does not decompose and is non-liquefiable and non-volatile at the temperature of the subsequent heat-treatment in an amount between about 0.5 percent and 5.0 percent calculated on the titanium dioxide, $TiO_2$ content of the said mixture, heating the said mixture at temperatures at which as indicated by an X-ray examination anatase titanium-oxygen compounds are converted to rutile titanium dioxide until such conversion takes place.

2. A method of preparing a pigmentary composition containing rutile titanium dioxide, which comprises forming an intimate and uniform mixture of anatase titanium-oxygen compounds and a small amount of an inorganic compound having crystalline characteristics classifiable within the sodium chloride crystallographic group which does not decompose and is non-liquefiable and non-volatile at the temperature of the subsequent heat-treatment in an amount between about 0.5 percent and 5.0 percent calculated on the titanium dioxide, $TiO_2$ content of the said mixture, heating the said mixture at temperatures at which as indicated by an X-ray examination anatase titanium-oxygen compounds are converted to rutile titanium dioxide until such conversion takes place.

3. A method of preparing a pigmentary composition containing rutile titanium dioxide, which comprises heating at temperatures between about 825° C. and about 950° C. an intimate and uniform mixture of anatase titanium-oxygen compounds and an inorganic compound having crystalline characteristics classifiable within the sodium chloride crystallographic group which does not decompose and is non-liquefiable at the temperature of the said heat-treatment in an amount between about 0.5 percent and 5.0 percent calculated on the titanium dioxide, $TiO_2$, content of the said mixture, until a conversion of anatase titanium-oxygen compounds to rutile titanium dioxide is discernible by means of an X-ray examination.

4. A method of preparing a pigmentary composition containing rutile titanium dioxide which comprises heating at temperatures between about 700° C. and about 1000° C. to form a non-liquefiable, non-volatile, thermally decomposable solid solution, an intimate mixture of anatase titanium-oxygen compounds and an inorganic compound having crystalline characteristics classifiable within the sodium chloride crystallographic group, mixing a small amount of the so-produced solid solution with additional relatively larger amounts of anatase titanium-oxygen compounds and heating the resultant mixture at temperatures between about 825° C. and about 950° C. for about three hours to six hours.

5. Method of claim 2, wherein the sodium chloride crystalline compound employed is lithium titanate.

6. Method of claim 1 wherein the compound employed is lithium carbonate.

7. Method of claim 1 wherein the compound employed is lithium chloride.

SANDFORD S. COLE.